United States Patent
Oughton

(10) Patent No.: US 10,381,917 B2
(45) Date of Patent: Aug. 13, 2019

(54) POWER CONVERTER APPARATUS AND METHODS USING ADAPTIVE NODE BALANCING

(71) Applicant: Eaton Corporation, Cleveland, OH (US)

(72) Inventor: George William Oughton, Raleigh, NC (US)

(73) Assignee: Eaton Intelligent Power Limited, Dublin (IE)

( * ) Notice: Subject to any disclaimer, the term of this patent is extended or adjusted under 35 U.S.C. 154(b) by 39 days.

(21) Appl. No.: 15/467,475

(22) Filed: Mar. 23, 2017

(65) Prior Publication Data

US 2018/0275699 A1  Sep. 27, 2018

(51) Int. Cl.
| | | |
|---|---|---|
| *H02M 1/15* | (2006.01) | |
| *G05F 1/14* | (2006.01) | |
| *H02M 1/14* | (2006.01) | |
| *H02M 3/155* | (2006.01) | |
| *H02M 5/458* | (2006.01) | |
| *H02M 7/44* | (2006.01) | |
| *H02M 7/483* | (2007.01) | |
| *H02M 3/158* | (2006.01) | |

(52) U.S. Cl.
CPC ............... *H02M 1/15* (2013.01); *G05F 1/14* (2013.01); *H02M 1/14* (2013.01); *H02M 3/155* (2013.01); *H02M 5/458* (2013.01); *H02M 7/44* (2013.01); *H02M 7/483* (2013.01); *H02M 2003/1586* (2013.01)

(58) Field of Classification Search
CPC .......... H02M 1/14; H02M 1/15; H02M 7/483; H02M 3/155; H02M 5/458; H02M 2003/1586; H02M 7/44; H02J 1/02; H02J 1/44; G05F 1/14
See application file for complete search history.

(56) References Cited

U.S. PATENT DOCUMENTS

| | | | | |
|---|---|---|---|---|
| 5,253,157 | A * | 10/1993 | Severinsky | ........... H02M 7/538 |
| | | | | 323/266 |
| 5,657,219 | A * | 8/1997 | Stanley | ............... H02M 3/1584 |
| | | | | 363/132 |
| 5,723,913 | A * | 3/1998 | Weggel | ................ H03K 17/102 |
| | | | | 307/113 |
| 5,814,965 | A * | 9/1998 | Randall | ................. H02P 25/092 |
| | | | | 318/400.11 |
| 6,038,157 | A * | 3/2000 | Mortimer | .............. H02M 7/519 |
| | | | | 363/136 |
| 6,483,730 | B2 | 11/2002 | Johnson, Jr. | |

(Continued)

*Primary Examiner* — Kyle J Moody
(74) *Attorney, Agent, or Firm* — Stanek Lemon Course & Meeks, P.A.

(57) ABSTRACT

An apparatus includes a first winding and a second winding on a core and having first taps coupled in common to a first node of an inverter circuit. The apparatus further includes a switching circuit configured to selectively couple a second tap of the first winding to a second node of the inverter circuit and to selectively couple a second tap of the second winding to a third node of the inverter circuit. The switching circuit may be configured to provide a desired balance of first and second voltages at respective ones of the second and third nodes with respect to the first node. Related methods are also described.

20 Claims, 5 Drawing Sheets

(56) References Cited

U.S. PATENT DOCUMENTS

| | | | | |
|---|---|---|---|---|
| 7,095,206 B2* | 8/2006 | Lequesne | ............ | H02H 7/0833 |
| | | | | 318/254.1 |
| 7,295,448 B2* | 11/2007 | Zhu | ................ | H02M 3/33576 |
| | | | | 363/132 |
| 7,423,894 B2* | 9/2008 | Ilic | .................... | H02M 3/1584 |
| | | | | 363/132 |
| 7,924,580 B2* | 4/2011 | Glaser | ................ | H02M 3/1588 |
| | | | | 363/24 |
| 8,270,191 B2* | 9/2012 | Zhu | ...................... | H02M 1/126 |
| | | | | 363/132 |
| 9,077,257 B2* | 7/2015 | Frium | .................... | H03F 3/217 |
| 9,297,862 B2* | 3/2016 | Oughton, Jr. | ......... | G01R 31/40 |
| 9,362,743 B2* | 6/2016 | Gazit | ...................... | H02J 1/10 |
| 9,755,533 B2* | 9/2017 | Imai | ................ | H02M 3/33569 |
| 9,873,342 B2* | 1/2018 | De Sousa | ............... | H02J 7/022 |
| 10,003,275 B2 | 6/2018 | Chen | | |
| 2013/0021827 A1 | 1/2013 | Ye | | |
| 2013/0229844 A1* | 9/2013 | Gazit | ................... | H02M 3/158 |
| | | | | 363/123 |
| 2014/0319916 A1* | 10/2014 | Cummings | ............ | H02J 1/102 |
| | | | | 307/53 |
| 2016/0329828 A1* | 11/2016 | Zhang | .................... | H02M 1/08 |
| 2017/0272005 A1* | 9/2017 | Chen | ...................... | H02M 1/15 |
| 2018/0278074 A1* | 9/2018 | Oughton, Jr. | ......... | H02J 7/0063 |

\* cited by examiner

POWER CONVERTER APPARATUS AND METHODS USING ADAPTIVE NODE BALANCING

BACKGROUND

The inventive subject matter relates to power converter apparatus and, more particularly, to power converter apparatus having DC buses.

Power converter apparatus, such as uninterruptible power supply (UPS) systems and grid-tie inverters, commonly include an inverter that receives power from a DC link. The inverter may produce a single or three phase output that is referenced to a neutral, and the DC link may include first and second buses that have respective positive and negative voltages with respect to the neutral.

Unbalanced loads may cause DC bus imbalance problems in three phase inverter systems. In particular, loading one phase of the inverter output more substantially than the other phases may result in an imbalance in the voltages on the positive and negative DC buses of the DC link with respect to a neutral of the inverter. Such problems may be addressed through the use of a "balancer" circuit that intermittently couples the DC buses to the neutral, as described, for example, in U.S. Pat. No. 6,483,730 to Johnson, Jr. et al. Such conventional balancer circuits may, however, generate undesirable ripple currents, even when the load is not unbalanced.

SUMMARY

Some embodiments of the inventive subject matter provide an apparatus including a first winding and a second winding on a core and having first taps coupled in common to a first node of an inverter circuit. The apparatus further includes a switching circuit configured to selectively couple a second tap of the first winding to a second node of the inverter circuit and to selectively couple a second tap of the second winding to a third node of the inverter circuit. The switching circuit may be configured to provide a desired balance of first and second voltages at respective ones of the second and third nodes with respect to the first node. In some embodiments, the first node may be a neutral and the second and third nodes may be first and second DC buses. In further embodiments, the first, second and third nodes may be nodes corresponding to various output levels of a multi-level inverter.

The switching circuit may include a first switch (e.g., a first transistor) configured to couple the second tap of the first winding to the second node, a second switch (e.g., a second transistor) configured to couple the second tap of the second winding to the third node, and a control circuit configured to control the first and second switches. The control circuit may be configured to operate the first and second switches at respective first and second duty cycles that are substantially the same. The first and second duty cycles may each be less than or equal to about 50%, and may be configured to allow a flux in the core to return to substantially zero during periods in which the first and second switches are open.

In further embodiments, the apparatus may further include third and fourth windings on a second core and having first taps coupled in common to the first node. A third switch may be configured to selectively couple a second tap of the third winding to the second node and a fourth switch may be configured to selectively couple a second tap of the fourth winding to the third node. The control circuit may be further configured to control the third and fourth switches. In some embodiments, the control circuit may be configured to operate the third and fourth switches at respective third and fourth duty cycles that are complementary to the first and second duty cycles.

Further embodiments of the inventive subject matter provide an apparatus including a DC link including first and second DC buses and a balancer circuit coupled to the first and second DC buses. The balancer circuit includes first and second windings on a core and having first taps coupled in common to a neutral, first and second switches configured to selectively couple second taps of respective ones of the first and second windings to respective ones of the first and second DC buses, and a control circuit configured to control the first and second switches to balance voltages between the first and second DC buses and the neutral. The apparatus may further include third and fourth windings on a second core and having first taps coupled in common to the neutral and third and fourth switches configured to selectively couple second taps of the third and fourth windings to second taps of respective ones of the third and fourth windings. The control circuit may be further configured to control the third and fourth switches to balance the voltages between the first and second DC buses and the neutral.

Still further embodiments provide methods of operating an inverter that include providing a first winding and a second winding on a core and having first taps coupled in common to a first node of the inverter and selectively coupling a second tap of the first winding to a second node of the inverter and a second tap of the second winding to a third node of the inverter to balance first and second voltages at the second and third nodes with respect to the first node.

DETAILED DESCRIPTION

Figure 1:
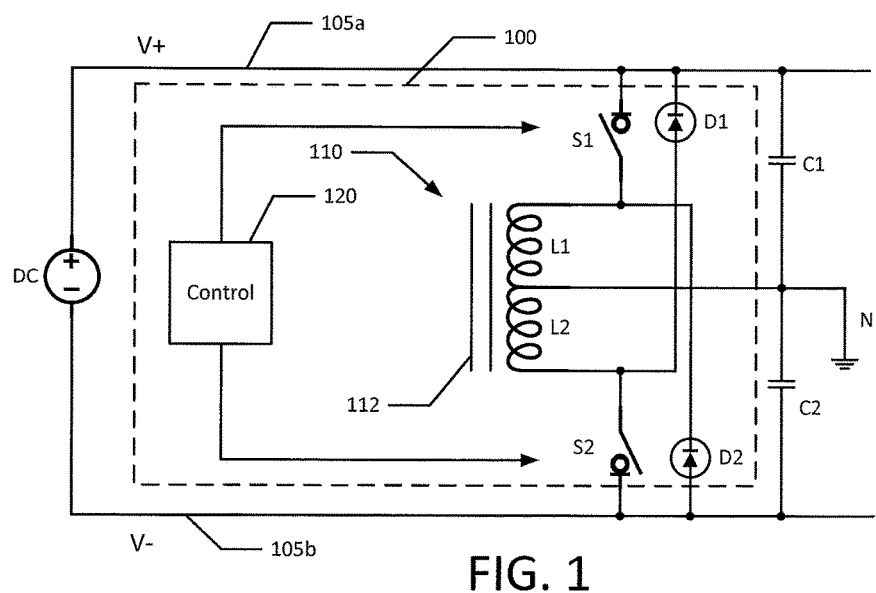
FIG. 1 is a schematic diagram illustrating a balancer circuit according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a balancer circuit 100 according to some embodiments of the inventive subject matter. The balancer circuit 100 includes a switching circuit configured to selectively couple first taps of first and second windings L1, L2 of a transformer 110 to respective ones of first and second DC buses 105a, 105b. The windings L1, L2 are disposed on a common magnetic core 112 and have second taps coupled in common to a neutral N. More specifically, the switching circuit includes a first switch S1 that connects the first tap of the first winding L1 to the first DC bus 105a, and a second switch S2 that connects the first tap of the second winding L2 to the second DC bus 105b. A first diode D1 connects the first tap of the second winding L2 to the first DC bus 105a and a second diode D2 connects the first tap of the first winding L1 to the second DC bus 105b.

Figure 2:
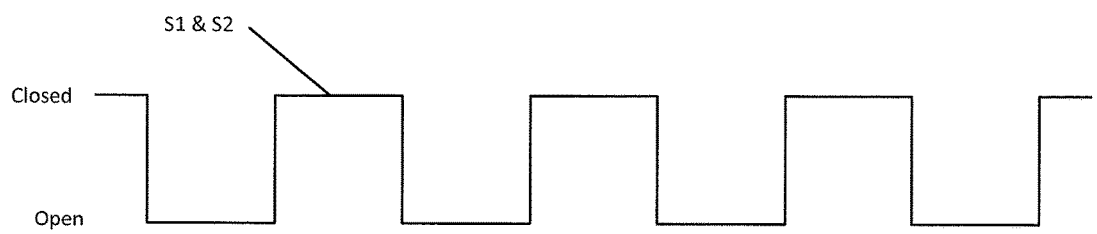
FIG. 2 is a waveform diagram illustrating operation of the balancer circuit of FIG. 1 according to some embodiments.

The windings L1, L2 preferably have an approximately 1:1 turns ratio, and the balancer circuit 100 takes advantage of this unity turns ratio to balance voltages V+, V− on the first and second DC buses 105a, 105b with respect to the neutral N. In some embodiments, a control circuit 120 controls the switches S1, S2 such that the switches S1, S2 operate at the substantially the same duty cycle. In particular, when the first and second switches S1, S2 are turned on, the 1:1 turns ratio drives the magnitudes of the voltages V+, V− toward equilibrium. The first and second switches S1, S2 are then turned off to initiate discharge of the first and second windings L1, L2 via the first and second diodes D1 D2 and allow the flux in the magnetic core 112 to fall to zero before the first and second switches S1, S2 are again turned on. In some embodiments, the first and second switches S1, S2 may be operated at a duty cycle of around 50%, as shown in FIG. 2. In some embodiments, the duty cycle can be less than the 50% shown in FIG. 2, although a reduced duty cycle may lead to less desirable performance (e.g., increased ripple currents).

It will be understood that the balancer circuit 100 may be implemented using any of a number of different types of components. In some embodiments, for example, the first and second switches S1, S2 may be implemented using transistors, such as insulated gate bipolar transistors (IGBTs) or power MOSFETs, or other types of semiconductor switches. The first and second switches S1, S2 may be bidirectional such that, for example, if IGBTs are used for the first and second switches S1, S2, respective antiparallel-connected diodes may be used with the IGBTs to provide bidirectionality (MOSFETs can have intrinsic body diodes that can eliminate the need for separate antiparallel diodes). The control circuit 120 may be implemented using any of variety of different analog and/or digital circuit components. For example, the control circuit 120 may be implemented using a data processing device, such as a microcontroller, along with peripheral circuitry configured to drive the first and second switches S1, S2. In some embodiments, the switches S1, S2 may be controlled using analog and/or discrete digital circuitry that provides similar functionality.

Figure 3:
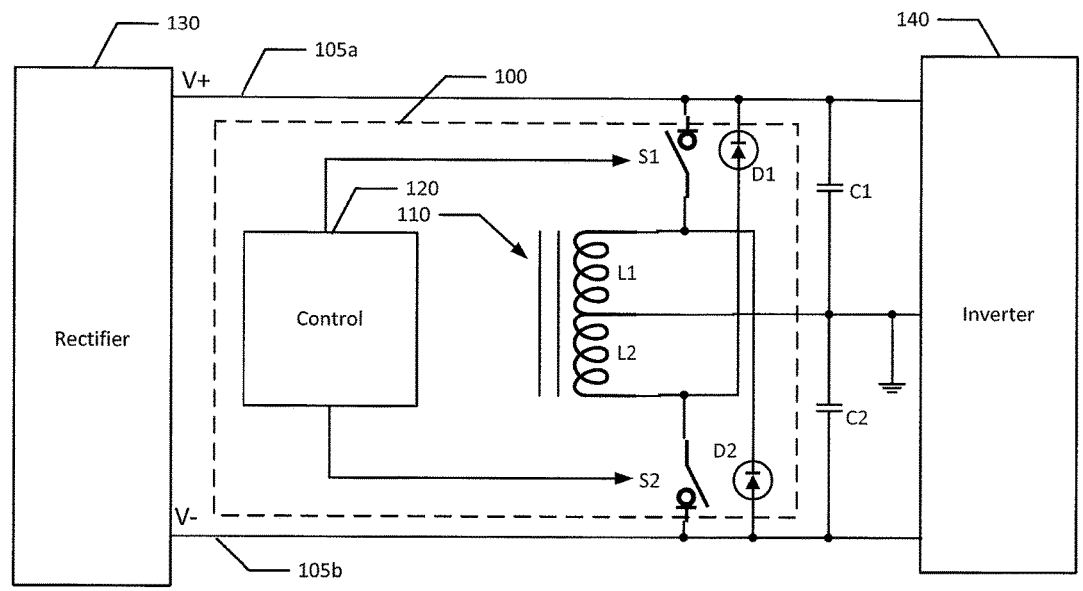
FIG. 3 is a schematic diagram illustrating an example application of a balancer circuit according to some embodiments.

FIG. 3 illustrates an exemplary application of the balancer circuit 100 according to further embodiments. In particular, FIG. 3 illustrates a power converter arrangement that might be used, for example, in an uninterruptible power supply. First and second DC buses 105a, 105b receive power from a rectifier circuit 130, which may be coupled to an AC power source, such as a utility source and/or motor/generator set. The first and second DC buses 105a, 105b may also be coupled to a DC power source, such as a battery, fuel cell and/or photovoltaic source. The first and second DC buses 105a, 105b are coupled to an inverter circuit 140, which may be coupled to a load. The inverter circuit 140 may be, for example, a three-phase inverter circuit that is used to supply power to a power distribution system in a data center or other environment. Along the lines discussed above, if the inverter circuit 140 produces an 50/60 Hz AC output, the balancer circuit 100 may, for example, operate the first and second switches S1, S2 at an approximately 50% duty cycle at a substantially higher frequency (e.g., 10 kHz) to equalize the magnitudes of the voltages V+, V− on the first and second DC buses 105a, 105b to compensate for unbalanced loading of the inverter circuit 140.

Figure 4:
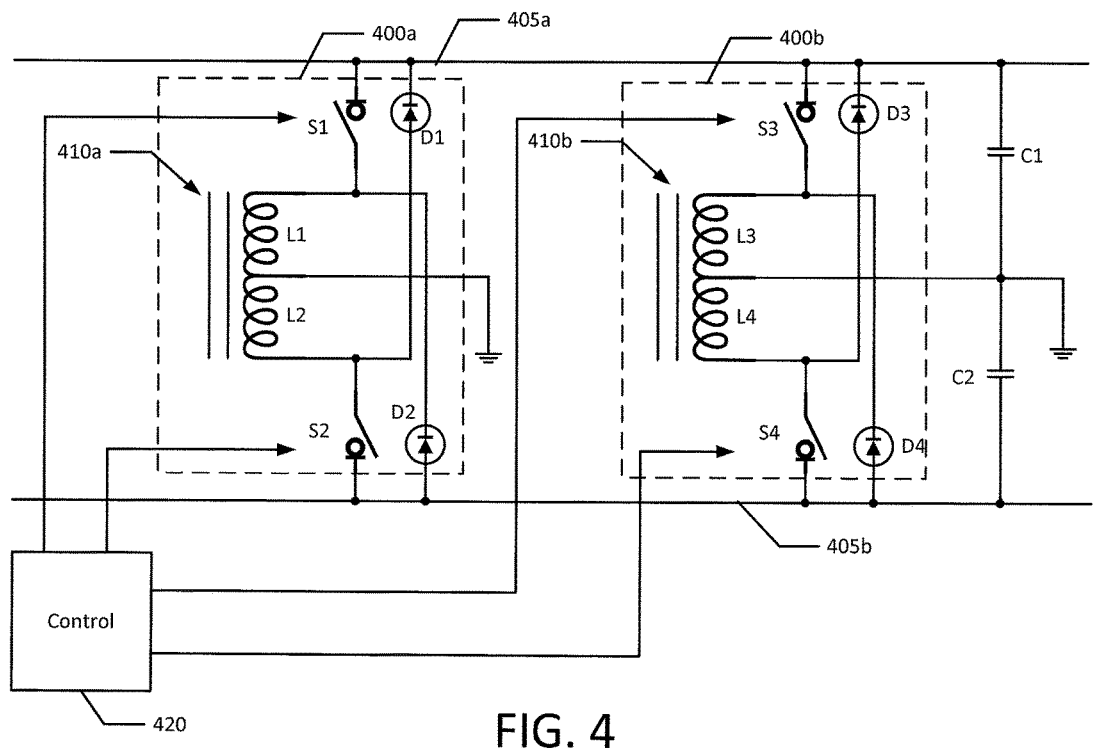
FIG. 4 is a schematic diagram illustrating an interleaved balancer circuit according to further embodiments.
Figure 5:
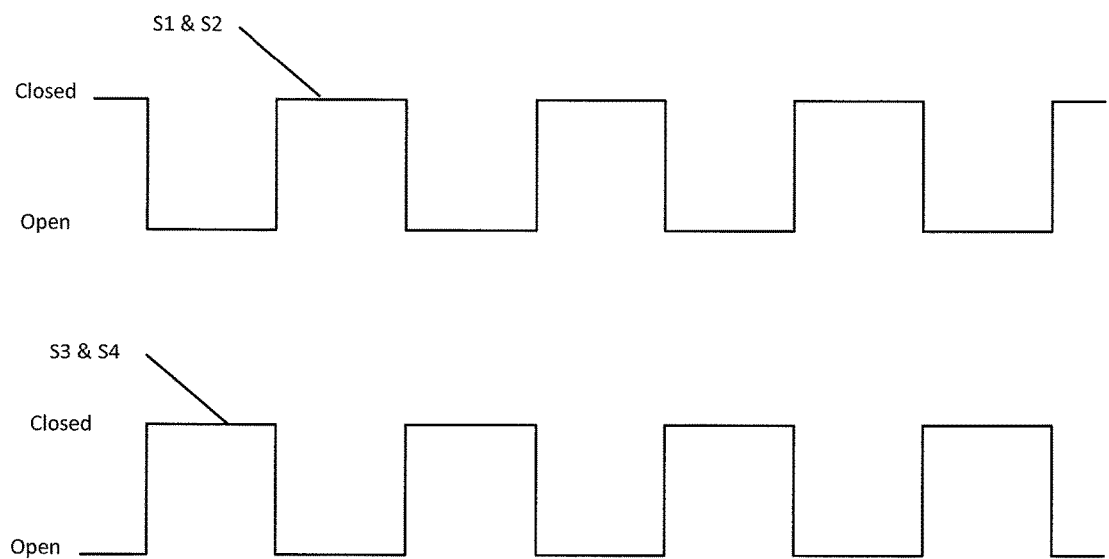
FIG. 5 is a waveform diagram illustrating operations of the balancer circuit of FIG. 4.
Figure 6:
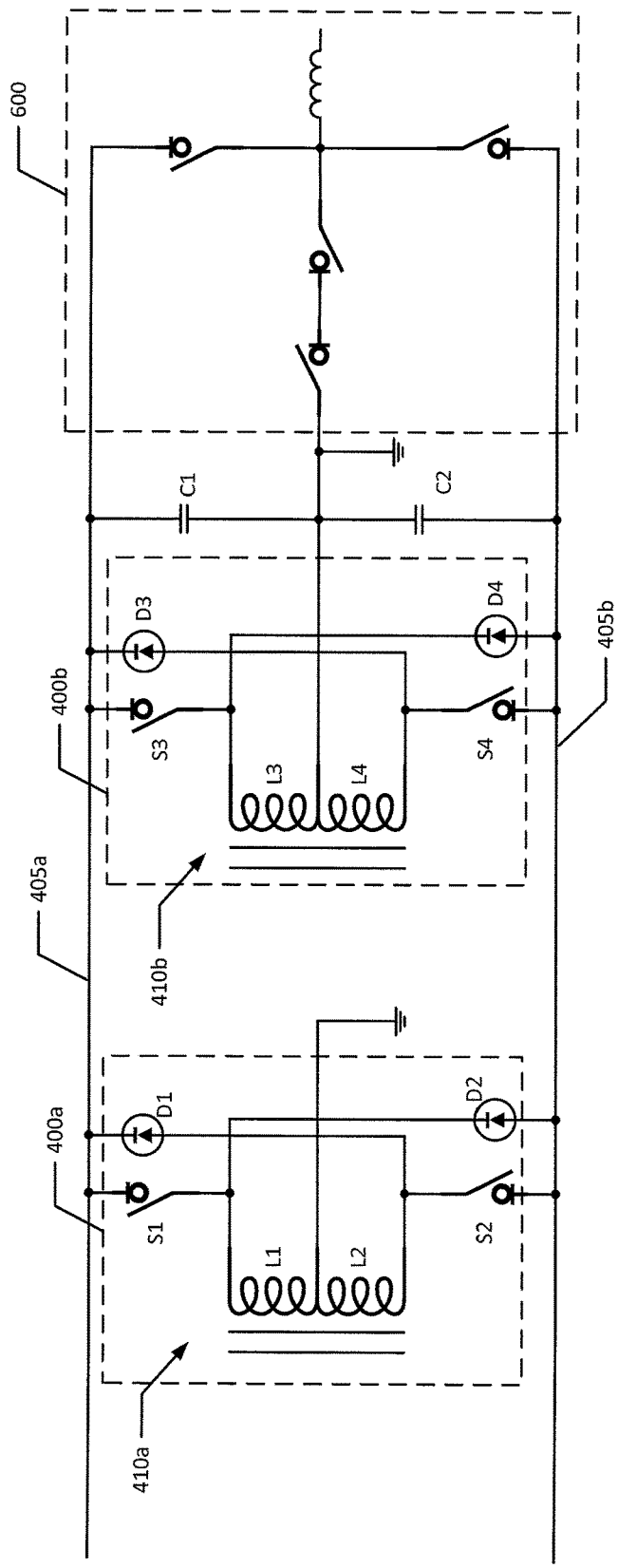
FIG. 6 is a schematic diagram illustrating 3-level inverter circuit application of the balancer circuit of FIG. 4 according to some embodiments.

According to further embodiments, improved performance may be achieved by using multiple balancer circuits that operate in an at least partially interleaved manner. Referring to FIG. 4, a balancer system may include first and second balancer circuit 400a, 400b coupled to first and second DC buses 405a, 405b. The first balancer circuit 400 includes a first transformer 410a, first and second switches S1, S2 and first and second diodes D1, D2 arranged as discussed above with reference to FIG. 1. The second balancer circuit 400b includes a second transformer 410b, third and fourth switches S3, S4 and third and fourth diodes D3, D4 similarly arranged. A control circuit 420 operates the first pair of switches S1, S2 and the second pair of switches S3, S4 in an interleaved manner. For example, as illustrated in FIG. 5, the switches S1, S2 of the first balancer circuit 400a may be operated in unison at a first 50% duty cycle, and the switches S3, S4 of the second balancer circuit 400b may be operated in unison at a second 50% duty cycle that is complementary to (shifted 180° with respect to) the first duty cycle. This arrangement can provide reduced ripple current because at least one of the first and second balancer circuits 400a, 400b is active at any given time. Such an arrangement may be particularly advantageous when used with a multi-level inverter circuit, such as the three-level inverter circuit 600 illustrated in FIG. 6. It will be appreciated, however, that such an arrangement may also be advantageously used with two-level inverter circuits.

Figure 7:
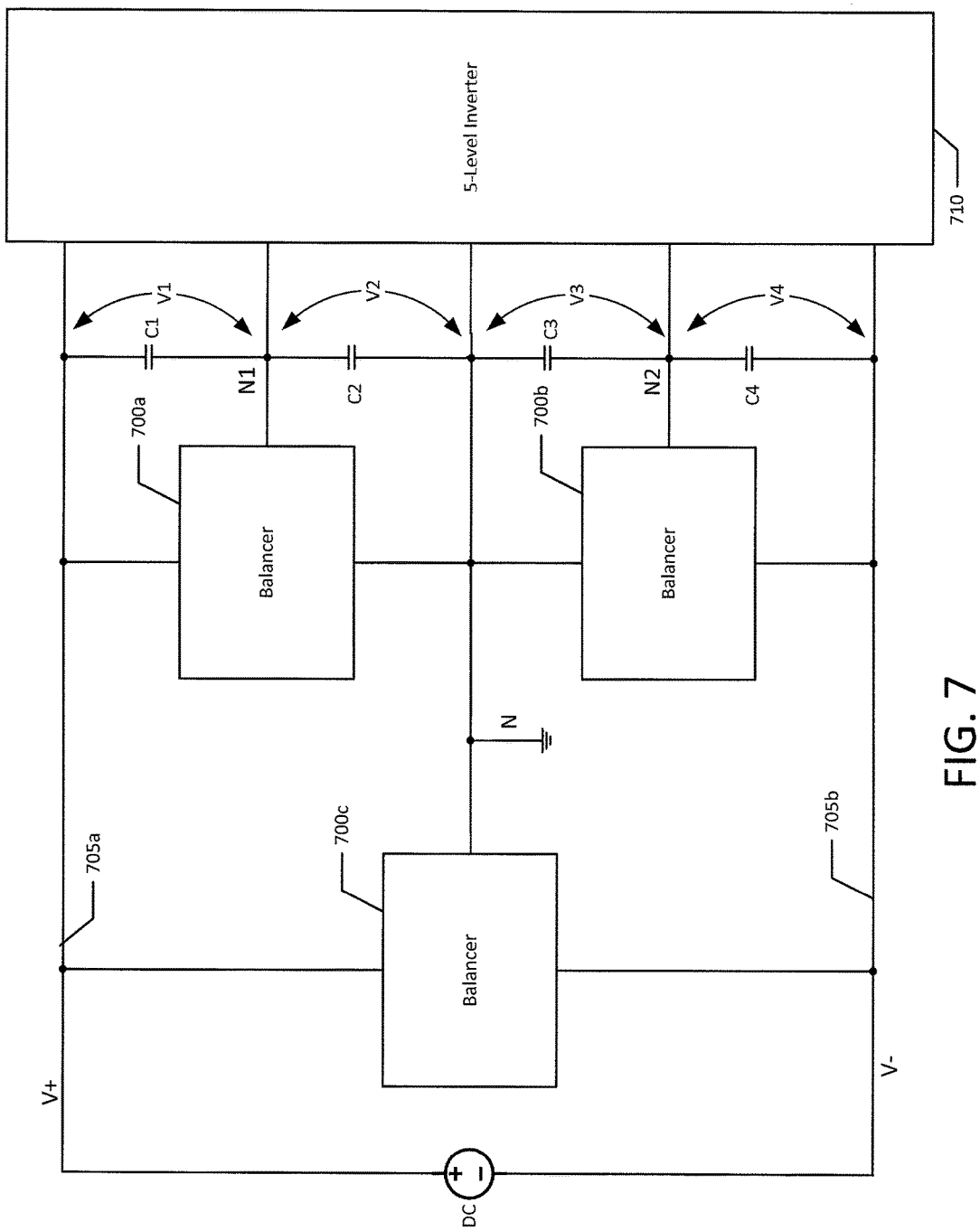
FIG. 7 is a schematic diagram illustrating a 5-level inverter circuit application of a balancer circuit according to further embodiments.

In further embodiments, combinations of balancer circuits along the lines described above may be used with a higher-order multi-level inverter circuit to balance voltages at various nodes of the inverter circuit. For example, as shown in FIG. 7, a first balancer circuit 700a may be used to balance voltages V1, V2 across a first pair of bus capacitors C1, C2 associated with an upper portion of a 5-level inverter circuit 710, i.e., to equalize magnitudes of the voltage V+ on a first DC bus 705a and a voltage at a neutral N with respect to an intermediate first node N1 of the inverter circuit 710. A second balancer circuit 700b may be similarly used to balance voltages V3, V4 across a second pair of bus capacitors C3, C4 associated with a lower section of the 5-level inverter circuit 710, i.e., to equalize magnitudes of the voltage at the neutral N and a voltage V− on a second DC bus 705b with respect to an intermediate second node N2 of the inverter circuit 710. A third balancer circuit 700c may be used to balance the voltages V+, V− on the first and second DC buses 705a, 705b with respect to the neutral N. The first, second and third balancer circuits 700a, 700b, 700c may have any of the configurations described above with reference to FIGS. 1-6. For example, various ones of the first, second and third balancer circuits 700a, 700b, 700c may have a single configuration as shown in FIG. 1 or a dual configuration as shown in FIG. 5.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   an inverter circuit; and
   a balancer circuit comprising:
      a first winding and a second winding on a core in a transformer arrangement and having first taps coupled in common to a first node of the inverter circuit; and
      a switching circuit configured to selectively couple a second tap of the first winding to a second node of the inverter circuit and to selectively couple a second tap of the second winding to a third node of the inverter circuit.

2. The apparatus of claim 1, wherein the switching circuit is configured to provide a desired balance of first and second voltages at respective ones of the second and third nodes with respect to the first node.

3. The apparatus of claim 1, wherein the first and second windings have a turns ratio of 1:1.

4. The apparatus of claim 1, wherein the switching circuit comprises:
   a first switch configured to couple the second tap of the first winding to the second node;
   a second switch configured to couple the second tap of the second winding to the third node; and
   a control circuit configured to control the first and second switches.

5. The apparatus of claim 4, wherein the control circuit is configured to operate both of the first and second switches at a first duty cycle.

6. The apparatus of claim 5, wherein the first duty cycle is less than or equal to 50%.

7. The apparatus of claim 5, wherein the first duty cycle allows a flux in the core to return to zero during periods in which the first and second switches are open.

8. The apparatus of claim 4, wherein the first and second switches comprise respective first and second transistors.

9. The apparatus of claim 5, wherein the core comprises a first core, and wherein the apparatus further comprises:
   third and fourth windings on a second core in a transformer arrangement and having first taps coupled in common to the first node;
   a third switch configured to selectively couple a second tap of the third winding to the second node; and
   a fourth switch configured to selectively couple a second tap of the fourth winding to the third node,
   wherein the control circuit is further configured to control the third and fourth switches.

10. The apparatus of claim 9, wherein the control circuit is configured to operate both of the third and fourth switches at a second duty cycle that is complementary to the first duty cycle.

11. The apparatus of claim 9, wherein the inverter circuit comprises a multi-level inverter circuit.

12. The apparatus of claim 1, wherein the first node comprises a neutral of an output of the inverter circuit.

13. An apparatus comprising:
   a DC link comprising first and second DC buses;
   a balancer circuit coupled to the first and second DC buses and comprising:
      first and second windings on a core in a transformer arrangement and having first taps coupled in common to a neutral;
      first and second switches configured to selectively couple second taps of respective ones of the first and second windings to respective ones of the first and second DC buses; and
      a control circuit configured to control the first and second switches to balance voltages between the first and second DC buses and the neutral.

14. The apparatus of claim 13, wherein the control circuit is configured to operate both of the first and second switches at a duty cycle less or equal to 50%.

15. The apparatus of claim 14:
   wherein the core comprises a first core;
   wherein the apparatus further comprises:
      third and fourth windings on a second core in a transformer arrangement and having first taps coupled in common to the neutral; and
      third and fourth switches configured to selectively couple second taps of the third and fourth windings to second taps of respective ones of the first and second DC buses; and
   wherein the control circuit is further configured to control the third and fourth switches to balance the voltages between the first and second DC buses and the neutral.

16. A method of operating an inverter, the method comprising:
   providing a first winding and a second winding on a core in a transformer arrangement and having first taps coupled in common to a first node of the inverter; and
   selectively coupling a second tap of the first winding to a second node of the inverter and a second tap of the second winding to a third node of the inverter using a balancer circuit separate from the inverter to balance first and second voltages at the second and third nodes with respect to the first node.

17. The method of claim 16, wherein the first and second windings have a turns ratio of 1:1.

18. The method of claim 16, wherein selectively coupling a second tap of the first winding to a second node of the inverter and a second tap of the second winding to a third node of the inverter to balance first and second voltages at the second and third nodes with respect to the first node comprises operating a first switch to couple the second tap of the first winding to the second node at a duty cycle and operating a second switch to couple the second tap of the second winding to the third node at the duty cycle.

19. The method of claim 18, wherein the duty cycle is less than or equal to 50%.

20. The method of claim 16, wherein the first node comprises a neutral.

\* \* \* \* \*